United States Patent [19]

D'Angelo

[11] 4,302,982
[45] Dec. 1, 1981

[54] KEY AND KEYWAY ARRANGEMENT

[75] Inventor: Ralph D'Angelo, South Toms River, N.J.

[73] Assignee: Bell Telephone Laboratories, Incorporated, Murray Hill, N.J.

[21] Appl. No.: 147,705

[22] Filed: May 8, 1980

[51] Int. Cl.³ .............................................. F16H 27/02
[52] U.S. Cl. ................................. 74/89.15; 74/424.8 R
[58] Field of Search ............. 308/3 R, 3 A; 74/89.15, 74/424.8 R, 424.8 VZ

[56] References Cited

U.S. PATENT DOCUMENTS

| | | | |
|---|---|---|---|
| 822,941 | 6/1906 | Glasrud | 74/424.8 R |
| 1,526,156 | 2/1925 | Kinney | 74/424.8 R |
| 2,401,757 | 6/1946 | Hardsocg | 74/424.8 R |
| 2,905,011 | 9/1959 | Armstrong et al. | 74/424.8 R |
| 3,402,613 | 9/1968 | Neusel et al. | 74/89.15 |
| 3,766,790 | 10/1973 | Weir | 74/89.15 |

OTHER PUBLICATIONS

"Hex Key Stops Hard Rock", Machine Design, vol. 44, Apr. 6, 1972, p. 100.
Erik Oberg et al., "Keys and Keyseats", Machinery's Handbook, pp. 991–1014.

Primary Examiner—Richard R. Stearns
Attorney, Agent, or Firm—Erwin W. Pfeifle

[57] ABSTRACT

The present invention relates to a key and keyway arrangement comprising a first slotted member (14) and a second support member (20) including a "U"-shaped wire guide (10) positioned in a manner whereby the ends thereof are fitted into a pair of spaced-apart apertures in the surface of the second member. The members are placed in relative position to each other so as to allow the curved section of the wire guide to protrude into the slot of the first member, forming a tangential relation therewith.

2 Claims, 3 Drawing Figures

KEY AND KEYWAY ARRANGEMENT

BACKGROUND OF THE INVENTION

1. Field of the Invention

This invention relates to a key and keyway arrangement, and more particularly, to a key and keyway arrangement including a key formed from a curved wire of circular cross-section so positioned in respect to the keyway that the outside bend of the curve remains tangential to the keyway.

2. Description of the Prior Art

Standard prior art key and keyway arrangements include keys of rectangular cross-section. Such a key, however, will usually sit improperly in its associated keyway, resulting in a rocking motion of the rectangular key in the keyway and eventual failure of the key.

One prior art alternative to the rectangular cross-section is discussed in the article "Hex Key Stops Hard Rock" in *Machine Design*, Vol. 44, Apr. 6, 1972 at page 100. A guide arrangement comprising a two-part key of hexagonal cross-section is described wherein one part of the key is placed in the keyway between a shaft and hub, and the remaining part is driven into place to produce a compressive stress on all working faces of the key and prevent rocking motion. The hexagonal cross-section, however, is difficult to machine for keys requiring very small dimensions or cross-section.

Alternative key designs are illustrated in *Machinery's Handbook-A Reference Book for the Mechanical Engineer, Draftsman, Toolmaker and Machinist*, Twentieth Edition, by Erik Oberg et al at pages 991-1014. In particular, specifications for keys comprising a semicircular side view are contained therein at page 998 in Table 9, "USA Standard Woodruff Keys". As shown in the illustration associated with this table, a key possessing this semi-circular side view retains two flat sidewalls that come in contact with the sidewalls of the keyway, thereby creating the situation in which the above-described rocking motion may occur. Further, as with the hexagonal key described above, the semi-circular key is difficult to manufacture beyond a limiting key diameter requirement.

The problem remaining in the prior art, then, is to provide a key and keyway arrangement where the key comprises a configuration that eliminates the rocking motion of the key in the keyway and yet provides for simple manufacture of keys requiring very small dimensions or cross-section.

SUMMARY OF THE INVENTION

The problem remaining in the prior art has been solved in accordance with the present invention, which relates to a key and keyway arrangement, and more particularly, to a key and keyway arrangement including a key formed from a curved wire of circular cross-section so positioned in respect to the keyway that the outside bend of the curve remains tangential to the keyway.

It is an aspect of the present invention to provide a key and keyway arrangement wherein the key is formed from a length of circular cross-sectional view which is bent, for example, into a "U" shape with the straight ends thereof disposed in corresponding spaced-apart apertures in a housing adjacent the keyway and aligned therewith and the curved portion of the key protruding into and engaging the keyway.

It is another aspect of the present invention to provide a key and keyway arrangement that can be used with, for example, an adjustable sliding short in millimeter and submillimeter circuits to direct longitudinal motion where space is limited.

BRIEF DESCRIPTION OF THE DRAWINGS

Referring now to the drawings in which like numerals represent like parts in several views.

DETAILED DESCRIPTION

Figure 1:
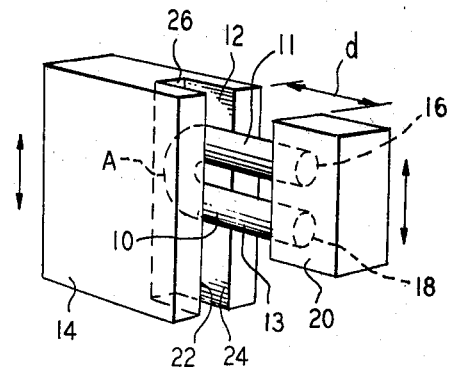
FIG. 1 is a view in perspective of an exemplary key and keyway arrangement formed in accordance with the present invention.

A view in perspective of an exemplary arrangement of the present invention is illustrated in FIG. 1. A key 10 is formed from a section of wire bent into a "U" shape and is inserted into a longitudinal keyway 12 in a first member 14, where the curved section of key 10 is disposed in a tangential relation with keyway 12, as denoted by point A of FIG. 1. Straight sections 11, 13 of the "U"-shaped key 10 protrude from member 14 and are disposed in a pair of spaced-apart apertures 16, 18, respectively, formed in the surface of a second member 20 and positioned adjacent to the longitudinal keyway 12 of first member 14 and aligned therewith. Members 14 and 20 are free to move in the longitudinal direction, individually or in opposition to each other. Key 10 is tangential to rear wall 26 of keyway 12 and is thereby capable of maintaining a predetermined separation between the members, as denoted by the letter d in FIG. 1, and, by virtue of the circular cross-section of the wire used to form key 10, the jamming associated with prior art keys which may impede the longitudinal movement of either member 14 or member 20 is eliminated.

Figure 2:
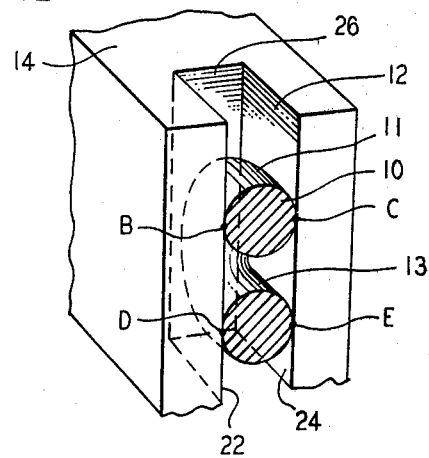
FIG. 2 is a close-up view in perspective of the exemplary key and keyway arrangement of FIG. 1 formed in accordance with the present invention.

A close-up view in perspective of the exemplary arrangement of the present invention of FIG. 1 is illustrated in FIG. 2, where second member 20 is removed to clearly show the relationship between "U"-shaped key 10 and first member 14. The straight sections 11, and 13 of key 10 enables the key to be disposed in a tangential relationship with inner sidewalls 22 and 24 of member 14 along lines B, C, D, and E, as illustrated in FIG. 2, where section 11 is tangent to sidewalls 22 and 24 along lines B and C, respectively, and section 13 is tangent to sidewalls 22 and 24 along lines D and E, respectively. Since each linear section 11 and 13 of key 10, as well as the curved section of key 10 that joins sections 11 and 13 is in contact with a particular sidewall along only one line, as opposed to prior art key and keyway arrangements where the entire surface of the side of the key is in contact with the keyway, the key disclosed in this invention will not be able to move in a side-to-side direction with respect to keyway 12, and further, the tangential contact will not impede the movement of either member 14 or member 20 (not shown) in a direction parallel to keyway 12, where this impediment problem is common in the above-mentioned prior art key and keyway arrangements.

Figure 3:
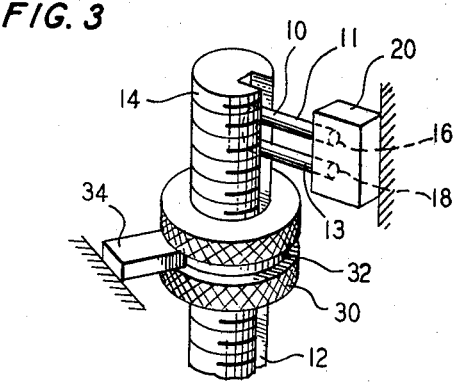
FIG. 3 contains an alternative embodiment of the present invention incuding a slotted screw.

An alternative embodiment of the present invention is illustrated in FIG. 3 where member 14 possesses a threaded outer surface. In this embodiment member 14 is inserted through the center opening of an annular member 30, where the inner surface surrounding the center opening of annular member 30 is threaded in a like manner as member 14. An external solt 32 is included around the circumference of annular member 30 and a pin arrangement 34 is disposed in external slot 32 to prevent a longitudinal movement of annular member 30. An application of a rotary motion to annular member 30 will therefore impart a longitudinal motion to member 14 in the same direction as keyway 12. An exemplary arrangement of this embodiment may comprise a key 10 of, for example, 0.001 inches in diameter and a threaded member 14 of, for example, 0.010 inches in diameter. These minute dimensions enable the present invention to be employed, for example, as an adjustable sliding short in millimeter and submillimeter waveguide circuits where space is limited.

I claim:

1. A key and keyway arrangement comprising:
   a first member (14) including a longitudinal keyway (12), and
   a second member (20) positioned adjacent to said keyway in said first member
   characterized in that
   the second member includes a pair of spaced-apart apertures (16,18) aligned with the keyway in the first member, and
   the arrangement further comprises a curved wire key (10) including a pair of straight end sections (11,13), each end section disposed in a separate one of said spaced-apart apertures included in said second member, said wire protruding therefrom into the keyway of the first member in a tangential relation therewith.

2. A key and keyway arrangement in accordance with claim 1
   characterized in that
   the first member is a slotted screw and the arrangement further comprises a threaded member (30) capable of imparting a longitudinal motion in said first member by applying a rotary motion thereto.

* * * * *